ible so that different weights suitable for the various

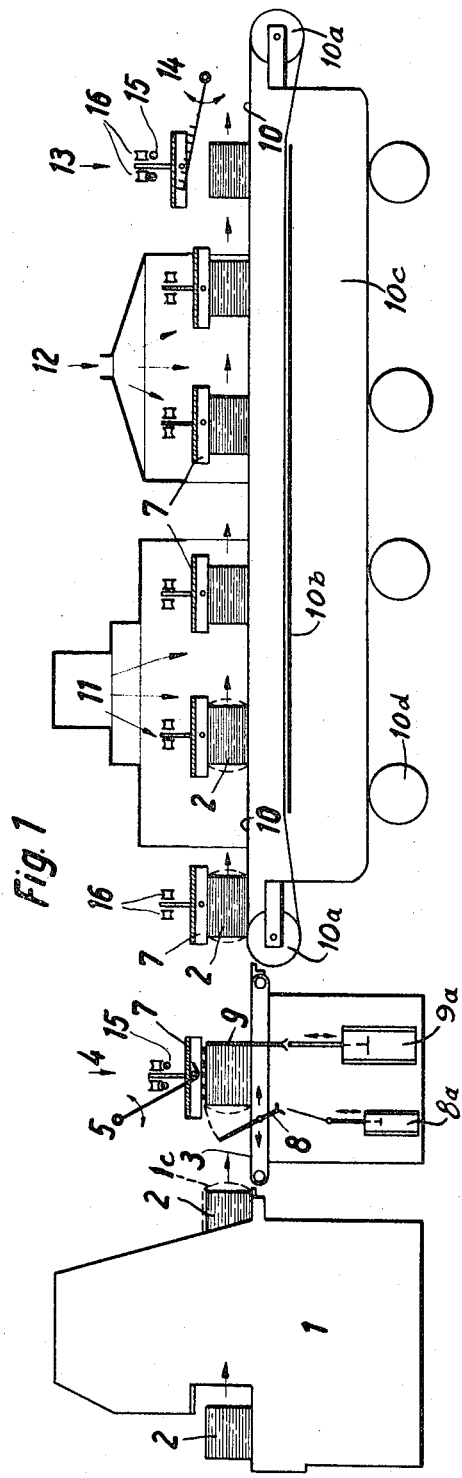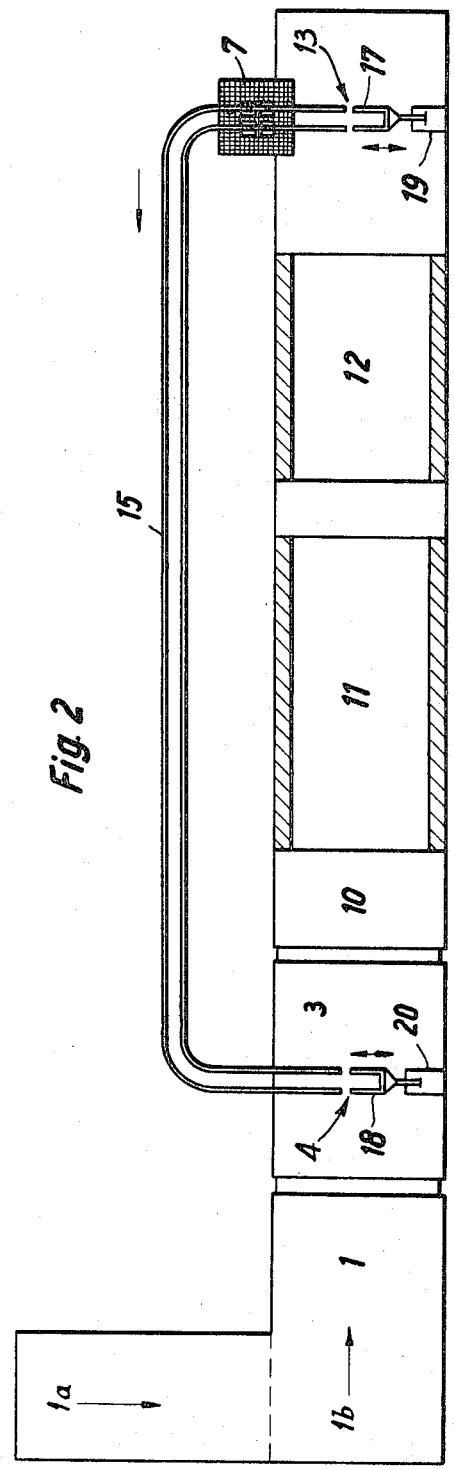

United States Patent Office 3,555,772
Patented Jan. 19, 1971

3,555,772
APPARATUS FOR PACKAGING NEWSPAPER STACKS
Karl Eugen Kammer, Monchen-Gladbach, Germany, assignor to Vertec-Gesellschaft fur Verpackungstechnik m.b.H. & Co., Monchen-Gladbach, Germany
Filed Aug. 15, 1968, Ser. No. 784,964
Claims priority, application Germany, Aug. 18, 1967, 1,586,331
Int. Cl. B65b 61/00, 53/06
U.S. Cl. 53—124        7 Claims

ABSTRACT OF THE DISCLOSURE

Stacks of newspapers are carried on conveyor means to a wrapping station for covering the stacks with plastic foil, then to a depositing station where a weight having openings therein is placed on the upper side of each stack, further to a heating station, thereafter to a cooling station if desired, and finally to a pick-up station where weights are removed from the stacks for return to the depositing station.

---

Figure 3:
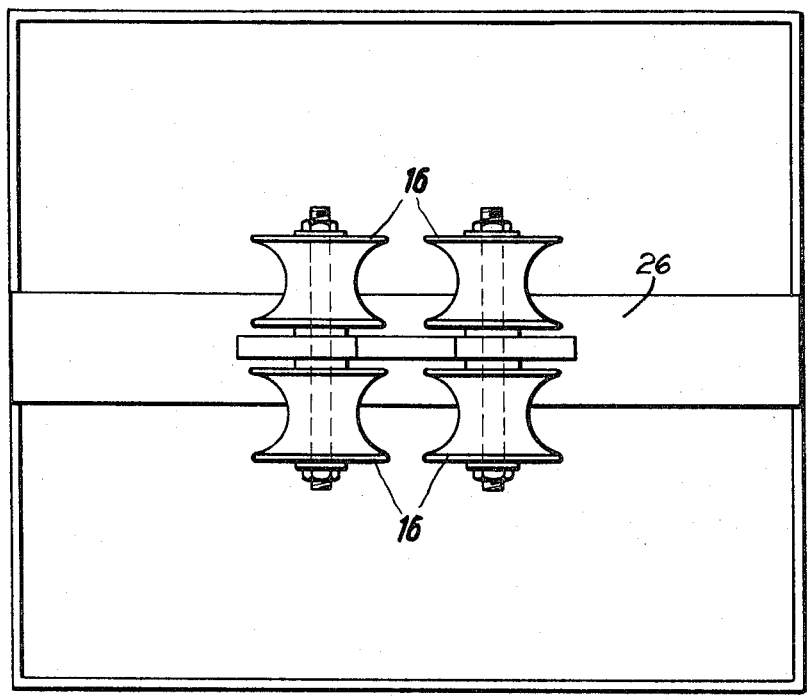

The invention relates to a device for packaging newspaper stacks in plastic foil which shrinks upon heating, and in which device the stacks are carried on a conveyor which consecutively passes the stacks through a station in which they are wrapped in plastic foil, a heating station in which the plastic foil is heated to a temperature sufficient for shrinking said foil and, possibly, a cooling station for cooling the plastic foil, and said device being provided with mechanisms for applying a load on the upper side of the stacks during their travel through the heating station and, possibly, the cooling station.

It is known how to package soft stackable goods, such as woolen blankets folded in the form of packages, in shrinkable foil with the goods being passed through the heating station while pressure is applied on the upper side. The top pressure ensures that the packet to be packaged retains the desired form, although the forces exerted by the shrinking foil tend to compress the packet from all sides.

With the known method the top load is applied by conveyor belts acting on the upper side of the goods, and said conveyor belts are synchronously driven with those conveyor belts which carry the goods.

Newspaper stacks are goods that are difficult to handle because they easily slip in their individual layers on account of vibrations or irregular effect of forces. For this reason, the known method for packaging such goods cannot be employed for newspaper stacks because the vibration-free synchronism without squeezing between the upper and lower conveyor belts cannot be attained in practice. Moreover, there is the disadvantage that all stacks travelling simultaneously between the carrying conveyor belt and the conveyor belt applying the pressure, must have the same height for otherwise a stack of lower height will not be subjected to sufficient top pressure. Finally, the conveyor belts applying pressure from the top have the disadvantage that they heat up considerably and will not cool sufficiently on account of their high heat retaining capacity, not even with the aid of a possible cooling station on their return from either the end of the heating station or the cooling station to the start of the heating station. Consequently, the conveyor belts heats up more and more until the danger of sticking to the plastic foil is brought about.

The invention is to provide a device of the type mentioned at the beginning, for packaging newspaper stacks with said device allowing a uniform load application on the newspaper stacks and by which no additional vibrations are transmitted to the stacks and which is independent of the height of the stacks and does not bring about undue heating of the pressing mechanism.

The solution in accordance with the invention exists in that the mechanisms for the top-side pressure application on the stacks consist of weights placed on the stacks prior to entering the heating station and which are removed again after leaving the heating station or, possibly, the cooling station.

To avoid hindering of the foil shrinkage on the upper side of the stacks, the weights are preferably constructed or made in form of grid-type or similar frames.

The weights serve for compressing the naturally loose newspaper stack so tightly that a sufficiently firm packet block is formed. Furthermore, they keep down the stack edges which normally tend to move upwards and which are otherwise likely to be pushed together on the upper side of the stack by the shrinking foil so that the package becomes unattractive and that the upper newspapers might become creased. The weights must remain on the stacks until the shrunken foil has cooled and strengthened sufficiently so that the expanding forces inside the stack can be absorbed by the foil. As stated, the weights should be so designed that they do not hinder the shrinkage of the foil on the upper side of the stack. For this purpose the weights may be grid-shaped on the side facing the stack to allow the passage of hot air. The size of the grid apertures may be adjustable.

An advantageous device is marked particularly in that the conveying path of the stacks to be packed passes a feeding station and depositing station for the weights and following this, the heating station, then the cooling station and finally a pick-up station for the weights and that a conveyor for returning the weights to the feeding and depositing station of the weights is provided. The return travel path of the weights gives them sufficient possibility to cool off completely.

In accordance with the invention, mechanisms for automatic depositing and removing the weights may be provided with said mechanisms preferably being coupled with the return conveyor.

The dimensions of the weights should preferably be just as large as the largest stack surface that is likely to occur. The weights may, but need not be in contact with the whole stack surface. Above all, it is the pressure the weights apply on the upwardly rising stack edges that is important. The weights should not be heavier than is necessary to fulfil their task in accordance with the nature of the handled stacks. The size of the weight may be variable.

Weights with one or several carrying rolls and conveyor lines acting together with said rolls for the purpose of returning the weights are provided.

In accordance with a special feature of the invention the weights may be provided on their underside with a die for marking the individual stacks or such a die may be attached to them. For example, the return conveyor for the weights may incorporate a station in which the weights are provided with dies for the individual stacks to be packaged. These dies may be matrixes which are also inked in said station. Thus, the stacks can be provided with addresses, the imprint of a destination or a code number without an additional operation and, if required, this can be performed also fully automatically. For example, in the matrix-changing station matrixes are stored for all occurring addresses. These matrixes are consecutively inserted and removed from the weights and here it is possible, of course, to ensure automatically that always a certain number of packages will be provided with a desired address. Suitable devices are known.

In order to make the unit suitable also for different and alternating stack heights an arrangement may be provided by which the depositing and pick-up mechanisms for the weights are automatically vertically adjusted through the action of sensing devices which determine the height of the stacks so that the weights are automatically adjusted to the individual stack height. It is desirable that the weights are gently deposited on the stacks without passing through a considerable distance of free fall.

In the following, the invention is explained in more detail with reference to the drawing which is a diagrammatic representation of a device for packaging newspaper stacks, and in said drawing FIG. 1 is a side elevation, FIG. 2 is a top plan view, and FIGS. 3 and 4 a top plan view and a sectional elevation of a weight, respectively.

In a wrapping machine 1, newspaper stacks 2 are introduced in the direction of the arrows 1a and 1b and are then wrapped more or less loosely in a plastic foil 1c in form of an all-round wrapper, the loose plastic foil 1c being indicated by a broken line. From said machine the stacks travel along on a conveyor belt 3 from the entry area thereof to a station 4 in which they are retained briefly for the purpose of being loaded with a grid-type weight 7 by a depositing mechanism 5 after the vertical stack sides have been corrected by means of plate or rake-type devices 8 and 9. These devices strike against the sides of the stacks either from below or from the side so that they are aligned; after this, the said devices are withdrawn from the conveying path again. The devices may be driven, for example, by the piston and cylinder mechanisms 8a, 9a indicated in the drawing. Then the stacks move on the conveyor belt 10 of the heating station 11. The conveyor belt 10 is guided by a pair of pulleys or rollers 10a and a member 10b mounted on a frame 10c which is supported by wheels 10d. During the shrinking process in the heating station and in the following cooling station 12 the grid-type weights remain on the stacks. Heating and cooling devices of this type are known so that an explanation can be dispensed with.

Finally, there is a station 13 which is located in the vicinity of the discharge area of belt 10, and in which the grid-type weights are removed from the stacks by a pick-up mechanism 14. Following this, the weights are moved to a conveyor track 15 which returns them to the feeding and depositing station 4, with said conveyor track consisting of twin rails for wheels or rolls 16 on the weights.

An end piece 17 of the track of the pick-up station 14 and an end piece 18 of the track of the depositing station 4 and the track are always arranged for a vertical and, possibly, horizontal adjustment and can be slipped under the rolls 16 of the weight which is lifted by the lifting fork 14 that is driven by the piston drive 19 or 20 and can be moved against the track 15 or be pulled from under the rolls of the weight which is held by the depositing fork 5 in station 4.

Figure 4:
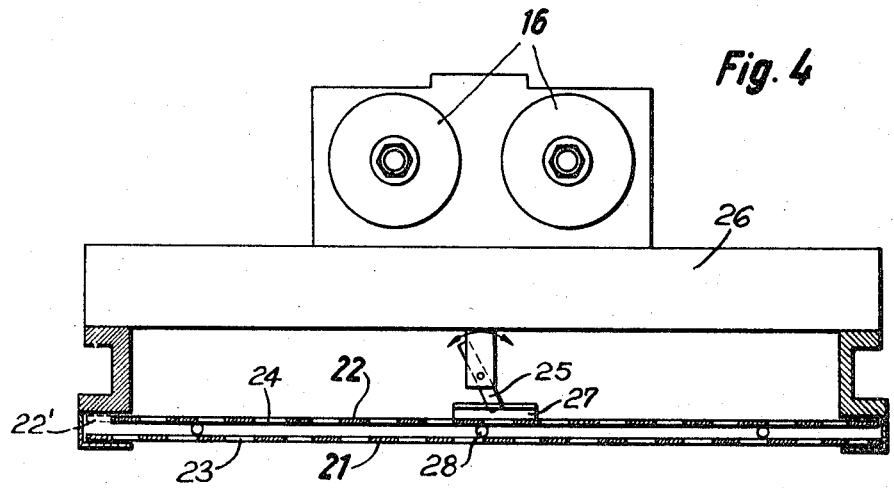

The shape of particularly suitable weights is shown in FIGS. 3 and 4. The structure applying the pressure on the stacks comprises two perforated plates 21 and 22 which can be parallely shifted in relation to each other, thus making it possible to reduce the passage of hot air from the top in case that sticking of the weights to the shrinkable plastic foil should occur. Openings 23 and 24 in the plates 21 and 22, respectively, may be aligned for maximum flow of air as indicated in broken lines at 22' in FIG. 4, or may be staggered relative to each other for restricted flow as shown in full lines in FIG. 4. The adjustability of the sliding grids is such that in the minimum flow position shown in full lines in FIG. 4, the flow of hot air is just sufficient to attain a slight shrinkage of the foil, that is, the grids cannot be so adjusted in relation to each other that a structure is formed which is impermeable to air and consequently completely heat shielding. A pivoted adjusting lever 25 is supported from an upper member 26 and engages a projection 27 on plate 22 which latter is carried by rolls 28 for horizontal movement between the position shown in full lines in FIG. 4 and the broken line position 22'.

I claim:

1. In apparatus for packaging newspaper stacks and the like in heat-shrinkable plastic foil, conveyor means for moving said stacks along a predetermined path of travel extending from an entry area to a discharge area; a wrapping station located in the vicinity of said entry area and equipped for covering each of said stacks with a layer of said plastic foil; a heating station located along said path of travel for heating said layer of plastic foil to a temperature sufficient to shrink said layer of foil; a plurality of weights for applying a load to the layer of foil on the upper side of each of said stacks during travel thereof at least through said heating station, said weights having openings therein for applying heat to said layer of foil on said upper side of each stack; first mechanism for placing said weights on the covered stacks prior to their travel through the heating station; and second mechanism for removing said weights from said covered stacks after the latter have advanced at least through said heating station.

2. Apparatus as defined in claim 1, wherein each of said weights has the shape of a grid at least at the side arranged to face one of said stacks.

3. Apparatus as defined in claim 2, including means for adjusting the effective size of the openings of said grid.

4. Apparatus as defined in claim 3, wherein each of said weights comprises a pair of substantially parallel plates each of a size at least sufficient to cover said upper side of each stack, each of said plates having a plurality of openings therein, said plates being mounted for movement relative to each other between a position in which the openings of both plates are aligned with each other, and another position in which the openings in one of the plates are staggered relative to the openings in the other plate.

5. Apparatus as defined in claim 1, including a cooling station following upon said heating station in the direction of travel of said stacks, said second mechanism being arranged to remove said weights from said stacks after the latter have left said cooling station.

6. Apparatus as defined in claim 1, wherein said first mechanism comprises an automatic feeding and depositing station for said weights, said feeding and depositing station being arranged between said wrapping station and said heating station; and wherein said second mechanism comprises an automatic pick-up station for said weights, said pick-up station being located in the vicinity of said discharge area for picking up said weights after travel on said stacks from said feeding and depositing station to said pick-up station; auxiliary conveying means being provided for returning picked-up weights from said pick-up station to said feeding and depositing station.

7. Apparatus as defined in claim 6, wherein said auxiliary conveying means comprises at least one track, each of said weights being provided with at least one wheel arranged to cooperate with said track.

References Cited

UNITED STATES PATENTS

| 3,323,630 | 6/1967 | Fowler et al. | 198—19 |
| 3,362,128 | 1/1968 | James | 53—24 |
| 3,411,265 | 11/1968 | Carpenter et al. | 53—42 |

FOREIGN PATENTS

| 1,075,614 | 7/1967 | Great Britain. | |

THERON E. CONDON, Primary Examiner

NEIL ABRAMS, Assistant Examiner

U.S. Cl. X.R.

34—236; 53—167, 184